(12) United States Patent  (10) Patent No.: US 8,549,041 B2
Thomsen et al.  (45) Date of Patent:  Oct. 1, 2013

(54) CONVERTER TRAVERSAL USING POWER OF TWO-BASED OPERATIONS

(75) Inventors: Dirk Thomsen, Heidelberg (DE); Ivan Schreter, Malsch (DE)

(73) Assignee: SAP AG, Walldorf (DE)

( * ) Notice: Subject to any disclaimer, the term of this patent is extended or adjusted under 35 U.S.C. 154(b) by 91 days.

(21) Appl. No.: 13/184,837

(22) Filed: Jul. 18, 2011

(65) Prior Publication Data

US 2013/0024450 A1  Jan. 24, 2013

(51) Int. Cl.
*G06F 7/00* (2006.01)
*G06F 17/30* (2006.01)

(52) U.S. Cl.
USPC ........... 707/797; 707/791; 707/790; 707/741; 713/180; 370/256

(58) Field of Classification Search
None
See application file for complete search history.

(56) References Cited

U.S. PATENT DOCUMENTS 7,346,009 B2 * 3/2008 Brown et al. ................. 370/256
2007/0074037 A1 * 3/2007 Eckleder ...................... 713/180

* cited by examiner

*Primary Examiner* — Jua-Shya Meng
(74) *Attorney, Agent, or Firm* — Buckley, Maschoff & Talwalkar LLC

(57) ABSTRACT

A system includes reception of a request for a page location corresponding to a logical page number, determination of a difference between the logical page number and a smallest logical page number of each of a plurality of converter leaf pages descending from a parent converter inner page, determination of a smallest number $2^x$ that is greater than the number of logical page number-to-page location mappings within each one of the plurality of converter leaf pages, right-shifting of a binary representation of the difference x positions to determine a branch index, identification of one of the plurality of converter leaf pages based on the branch index and on an indexed list of converter page identifiers within the parent converter inner page, logically ANDing of the binary representation of the difference with a binary representation of $2^x-1$ to determine a mapping index of the identified converter leaf page, identification of a mapping of the identified converter leaf page based on the mapping index, and determination of the page location corresponding to the logical page number based on the mapping.

15 Claims, 5 Drawing Sheets

CONVERTER TRAVERSAL USING POWER OF TWO-BASED OPERATIONS

FIELD

Some embodiments relate to database systems. In particular, some embodiments concern converters used to implement shadow paging in a database system.

BACKGROUND

A conventional database system uses a datastore to persistently store data pages, and a cache to provide fast access to the data pages. For example, in response to a request to access a data page, the data page is loaded from the datastore into the cache, and may thereafter be accessed from and/or modified within the cache.

The datastore may include a tree of converter pages. Converter pages at the lowest level of the tree map the logical page numbers of data pages to locations of the datastore at which the data pages are stored. The tree of converter pages is loaded into the cache upon initialization of the database system, and the cached converter pages are used to determine the location of a particular page within the datastore in response to a request to access the particular page.

In order to determine the location of a particular page in the datastore, the cached tree of converter pages is traversed from its root level to a particular converter leaf page, which is located at the lowest level of the tree and which specifies the location of the particular page. FIG. 1 illustrates converter 10 of a prior database system. Converter 10 includes converter inner pages 11 and converter leaf pages 12.

Each inner page 11 includes an indexed list of unique identifiers of one or more child converter pages, which may comprise one or more other inner pages 11 or one or more leaf pages 12. The child converter pages may be located within the cache based on a hashmap which associates the unique identifiers with cache memory addresses at which corresponding child converter pages are located. Each converter leaf page 12 maps a set of logical page numbers to datastore locations at which corresponding data pages are stored. Inner pages 11 may therefore be used to locate a converter leaf page 12 corresponding to a particular logical page number within the datastore.

Generally, the size of each page of converter 10 is a power of two (i.e., $2^x$), and each page includes a header. For example, each page may be 256 Kb (i.e., $2^8$ Kb) in size, with each inner page 11 including a 16 byte header and each leaf page including an 8 byte header. Accordingly, each inner page 11 includes $2^8-2$ child identifiers and each leaf page 12 includes $2^8-1$ logical page number-to-datastore location mappings.

To describe an example of converter traversal according to some prior systems, it will be assumed that a process has requested logical page number seventeen of a database. Accordingly, assuming that logical page number seventeen is not located within the database cache, the location of logical page number seventeen within the datastore must be determined. Converter root page 13 is initially located and the number of page number-to-page location mappings corresponding to each of descendant branches 14-16 is determined. In the present example, each of branches 14-16 includes fourteen page number-to-page location mappings. More specifically, each of branches 14-16 includes two converter leaf pages, and each converter leaf page includes seven page number-to-page location mappings.

To determine which of branches 14-16 to descend, the logical page number (i.e., seventeen) is initially divided by the number of mappings addressable by one descendant branch (i.e., fourteen). The resulting quotient in the present example is "1", while the remainder (i.e., "3") is ignored (or not computed). As shown in FIG. 1, root page 13 stores an indexed list of child page identifiers (i.e., 0:28, 1:0FC and 2:33A). The quotient is used to determine a child page identifier from the indexed list. In the present example, the identifier 0FC is determined because it is associated with index 1. Therefore, converter page 18 corresponding to the identifier 0FC is located within the cache using the aforementioned hashmap.

Next, the smallest logical page number accessible in the current branch is determined. The difference (i.e., three) between this number (i.e., fourteen) and the logical page number of interest (i.e., seventeen) is determined. As before, the number of page number-to-page location mappings corresponding to each of descendant branches 20 and 21 is then determined (i.e., seven). The difference (i.e., three) is divided by the number of mappings (i.e., seven) to produce a quotient (i.e., 0) and a remainder (i.e., 3).

The quotient is used to determine a child page identifier from the indexed list stored in converter page 18. The determined identifier in the present example is 94 because the quotient is 0, and the identifier is used in conjunction with the hashmap to locate leaf page 22 within the cache. The remainder is then used to identify an appropriate mapping stored within leaf page 22. Specifically, the remainder 3 points to the fourth mapping of leaf page 22. In this regard, the first mapping (i.e., having index 0) of leaf page 22 is associated with logical page fourteen, the second mapping is associated with logical page fifteen, and the third mapping is associated with logical page sixteen, so the fourth mapping of leaf page 22 (i.e., having index 3) is associated with logical page seventeen and specifies the location of logical page seventeen within the datastore.

As described, the descent from one converter inner page (including the root page) to a child converter inner page requires a division operation (i.e., to determine the identifier of the child converter inner page), and the descent from a converter inner page to a child converter leaf page also requires a division operation (i.e., to determine the identifier of the child converter leaf page). To identify an appropriate mapping within the child converter page, systems may employ either a modulo operation (as illustrated above when descending from inner converter page 18 to leaf converter page 22) or, as an optimization, subtraction of the smallest logical page number addressed by the converter page (as illustrated above when descending from root converter page 13 to inner converter page 18). Division and modulo operations are computationally expensive and significantly impede the speed of tree traversal.

DETAILED DESCRIPTION

Figure 2:
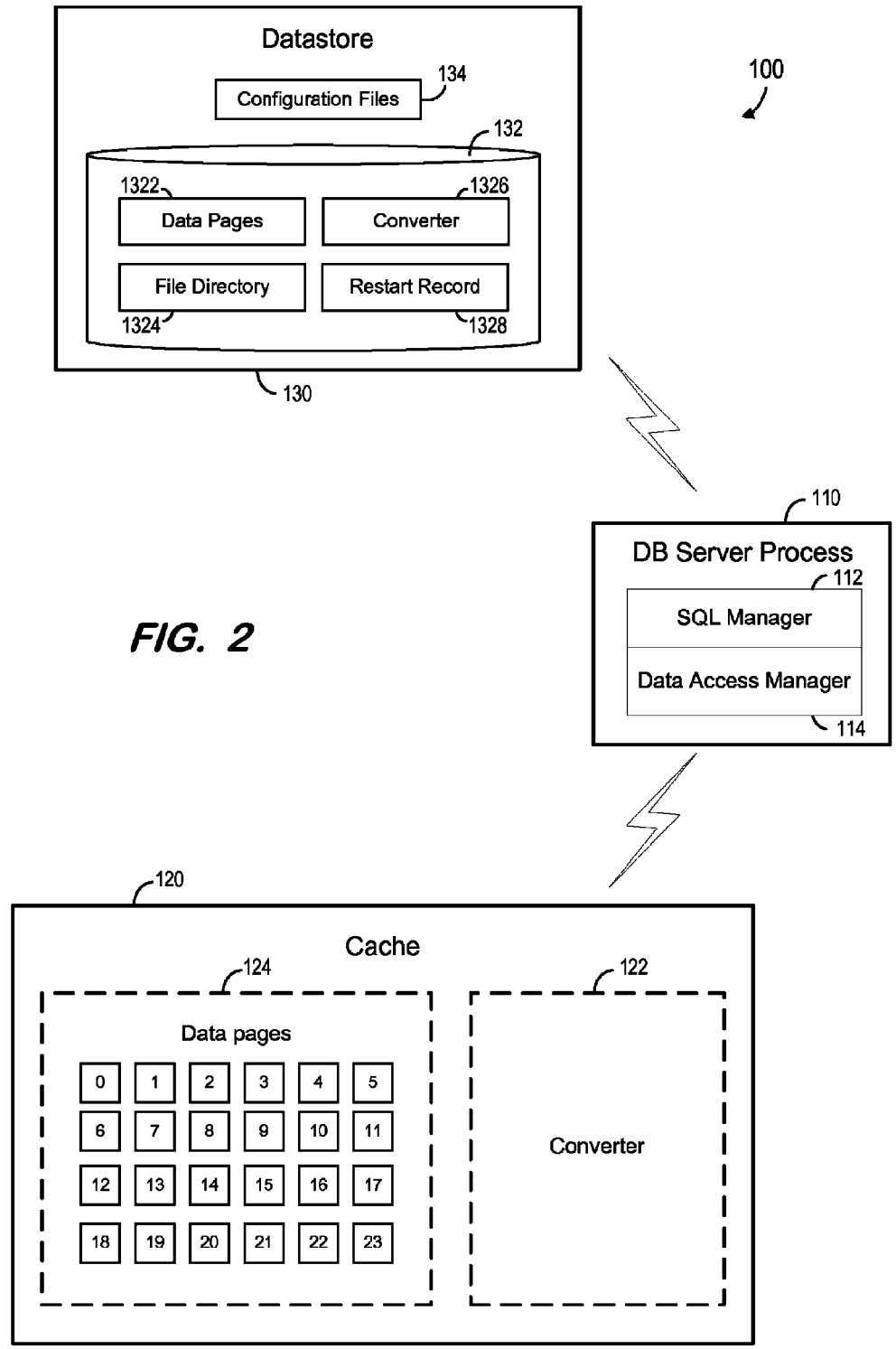
FIG. 2 is a block diagram of a database according to some embodiments.

FIG. 2 is a block diagram of database system 100 according to some embodiments. Database system 100 includes database server process 110, cache 120 and datastore 130.

Database system 100 may communicate with one or more database applications (not shown) over one or more interfaces (e.g., a Structured Query Language (SQL)-based interface). The database applications may provide, for example, business reporting, inventory control, online shopping, and/or any other suitable functions. The database applications may, in turn, support client applications that may be executed by client devices. Such a client application may simply comprise a Web browser to access and display reports generated by a database application.

The data of database system 100 may be received from disparate hardware and software systems, some of which are not interoperational with one another. The systems may comprise a back-end data environment employed in a business or industrial context. The data may be pushed to database system 100 and/or provided in response to queries received therefrom.

Although embodiments are described with respect to database system 100, which is a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. Database system 100 may also or alternatively support multi-tenancy by providing multiple logical database systems which are programmatically isolated from one another.

Database system 100 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Database server process 110 may comprise any system for managing a database system that is or becomes known. Generally, database server process 110 may receive requests for data (e.g., SQL requests from a database application), may retrieve the requested data from datastore 130 or from cache 120, and may return the requested data to the requestor. In some embodiments, database server process 110 includes SQL manager 112 to process received SQL statements and data access manager 114 to manage access to stored data. Database server process 110 may also perform start-up, logging, recovery, management, optimization, monitoring, indexing, integrity checks and other database-related tasks.

Database server process 110 may comprise and/or may be implemented by computer-executable program code. For example, database system 100 may comprise one or more hardware devices, including at least one processor to execute program code so as to cause the one or more hardware devices to provide database server process 110.

For purposes of the foregoing description, it will be assumed that datastore 130 comprises only data volume 132. Datastore 130 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or Random Access Memory ("RAM"). In regards to the latter alternative, database system 100 may comprise an "in-memory" database, in which both the data of datastore 130 and cache 120 are stored in volatile (e.g., non-disk-based) memory (e.g., RAM). In some embodiments, the stored data may comprise one or more of conventional tabular data, row-based data, columnar data, and object data.

Generally, a data volume is subdivided into storage areas known as blocks, and data is stored in the data volume in data pages 1322, each of which has the same size as a block. Accordingly, a particular data page 1322 of datastore 130 may be accessed by referencing the data volume and block address associated with that data page. Data pages 1322 may include application data consisting of tabular data, row-based data, columnar data, object data and associated index entries. In a case that datastore 130 includes more than one data volume, data pages 1322 may be spread across one or more of its data volumes.

Data volume 132 includes file directory 1324 and converter 1326. If datastore 130 includes more than one data volume, file directory 1324 and converter 1326 may also be spread across one or more of the data volumes. When a new data page is created, the data page is assigned a unique logical page number. As described in the foregoing Background, converter 1326 maps this logical page number to the data volume and block address at which the data page is stored. File directory 1324 maps a file identifier to a logical page number of a corresponding file root page, and the aforementioned database catalog maps each file identifier to associated metadata, including a name of a database object associated with the file identifier. Accordingly, the information of the database catalog and file directory 1324 may be used to determine a logical page number from a name of a database object, for example. Restart record 1328, which may also be stored in any data volume of datastore 130, identifies a location of a root page of converter 1326.

The processes described below may also be applicable to "in-memory" implementations. However, an identifier of a data volume in which a page is stored might not be utilized in such implementations, as the in-memory datastore might simply comprise addressable memory locations which are not divided into logical data volumes.

Datastore 130 may also include configuration files 134 defining properties of database system 110 (e.g., a size and physical location of each data volume, a maximum number of data volumes in datastore 130, etc.). Moreover, datastore 130 typically includes system files, database parameters, paths, user information and any other suitable information. Datastore 130 may also store a database catalog including metadata describing the database objects that are stored therein.

Cache 120 may be implemented in RAM, and stores various elements of datastore 130 during execution of database system 100. These elements may include recently-accessed ones of data pages 1322, pages of converter 1326, and/or a log queue. As shown, cache 120 includes cached converter 122 and data pages 124. Converter 122 and data pages 124 are illustrated separately herein for the sake of clarity. However, according to some embodiments, converter 122 and data pages 124 might not comprise separate, contiguous memory addresses of cache 120. For example, pages of converter 122 may be interspersed among data pages 124 throughout cache 120.

The pages of converter 1326 are created in cache 120 as converter 122 in order to provide fast access to data pages 1322. In this regard, a database transaction may require access to a database object stored in data pages 1322. A file identifier corresponding to the database object is determined based on the database catalog, and a logical page number of a root page of the database object is determined from the file identifier using file directory 1324. Next, converter 122 within cache 120 is traversed as will be described below to determine a location of data volume 132 at which the root page is stored, based on the logical page number. The page location may be represented by an abstract identifier such as a block address of data volume 132, or by any other identifier of a page location.

Figure 3:
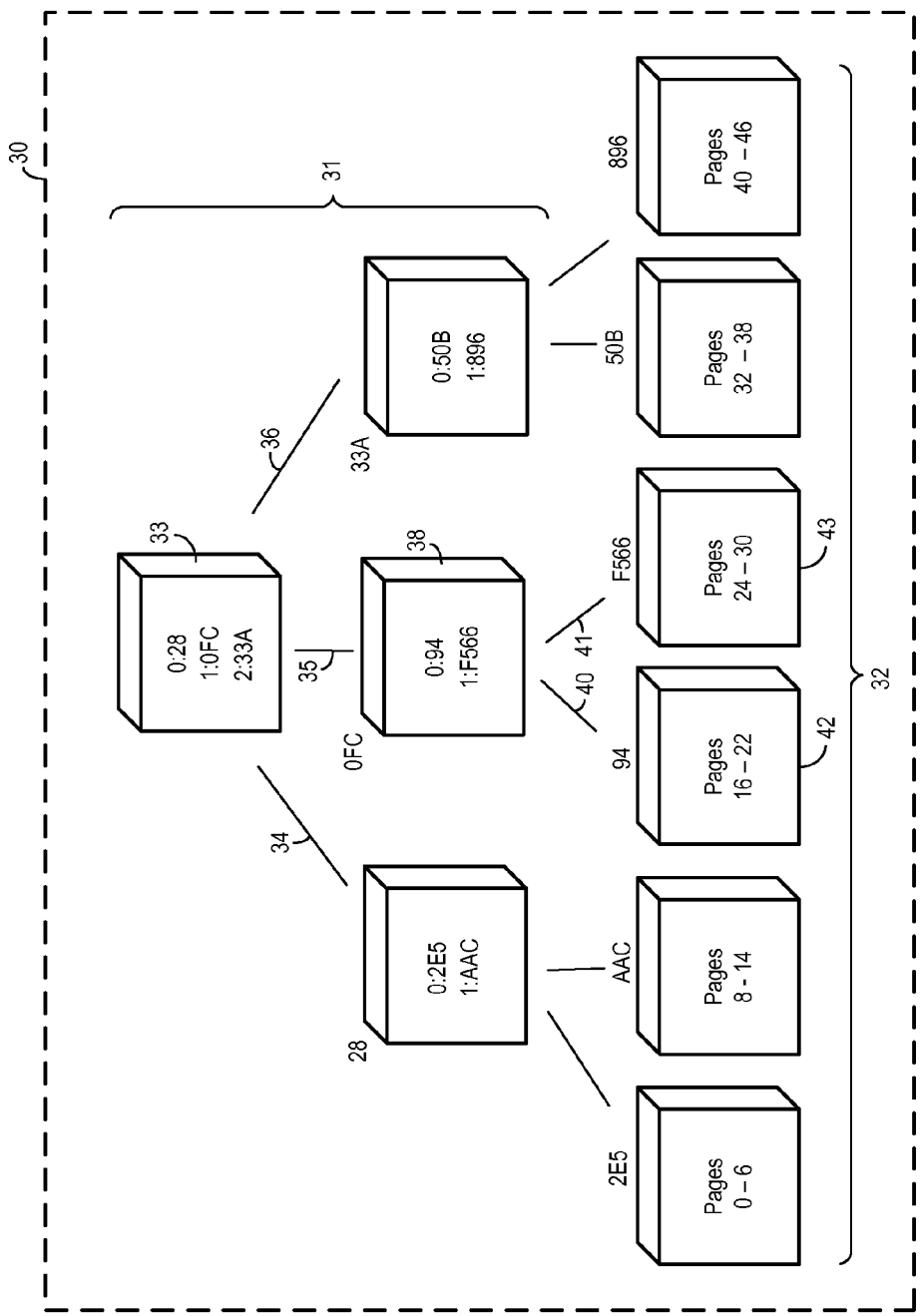
FIG. 3 illustrates a converter according to some embodiments.

FIG. 3 illustrates converter 30 which may be stored in a cache such as cache 120 according to some embodiments. Converter inner pages 31 and converter leaf pages 32 of converter 30 were loaded into the cache based on a converter of a persisted (or in-memory) datastore.

Figure 1:
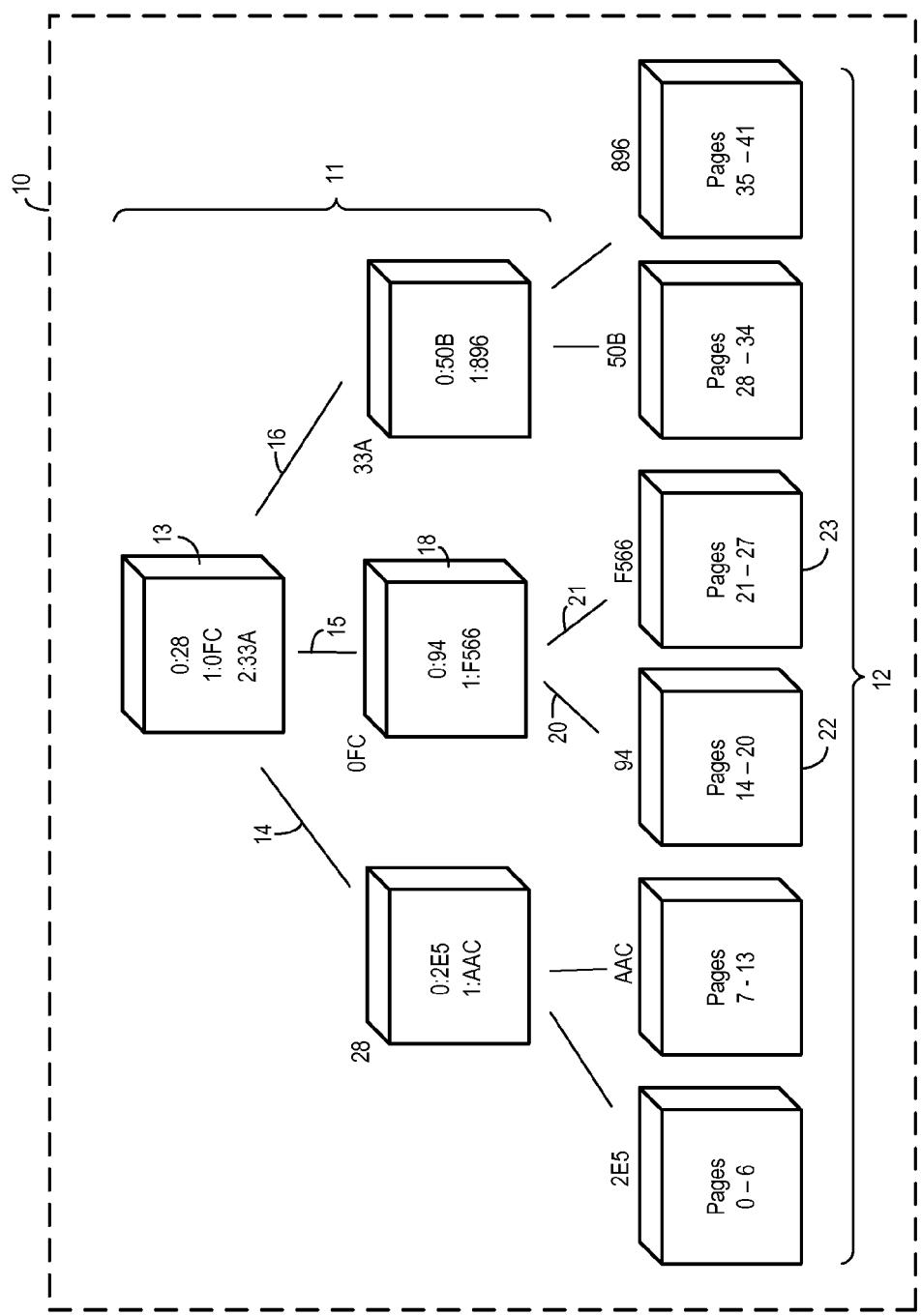
FIG. 1 illustrates a prior art converter.

As described with respect to converter 10 of FIG. 1, each inner page 31 includes an index to the unique identifiers of one or more child converter pages, which may comprise one or more other inner pages 31 or one or more leaf pages 32. The locations of the child converter pages within the cache may be determined based on a hashmap which associates the unique identifiers with the cache memory addresses of the corresponding child converter pages. Each converter leaf page 32 maps a set of logical page numbers to datastore locations at which corresponding data pages are stored, so inner pages 31 may be used to locate a converter leaf page 32 corresponding to a particular logical page number within the datastore.

In contrast to prior converters, converter pages 31 and 32 do not include mappings for some logical page numbers, such as page numbers seven, fifteen, twenty-three, thirty-one and thirty-nine on the leaf level. As will be described in detail below, such omission allows tree traversal to proceed under an assumption that each leaf page corresponds to $2^k$ mappings even though each leaf page in the present example actually includes $2^k-1$ mappings. Embodiments are not limited to leaf pages including $2^k-1$ mappings; for example, in some embodiments, one or more leaf pages may include $2^k-2$ mappings. The same holds for index pages, where each index page holds, for example, $2^p-1$ mappings, which correspond to a block of $2^m$ pages, where m=k+(maxdepth−depth)*p.

Figure 4A:
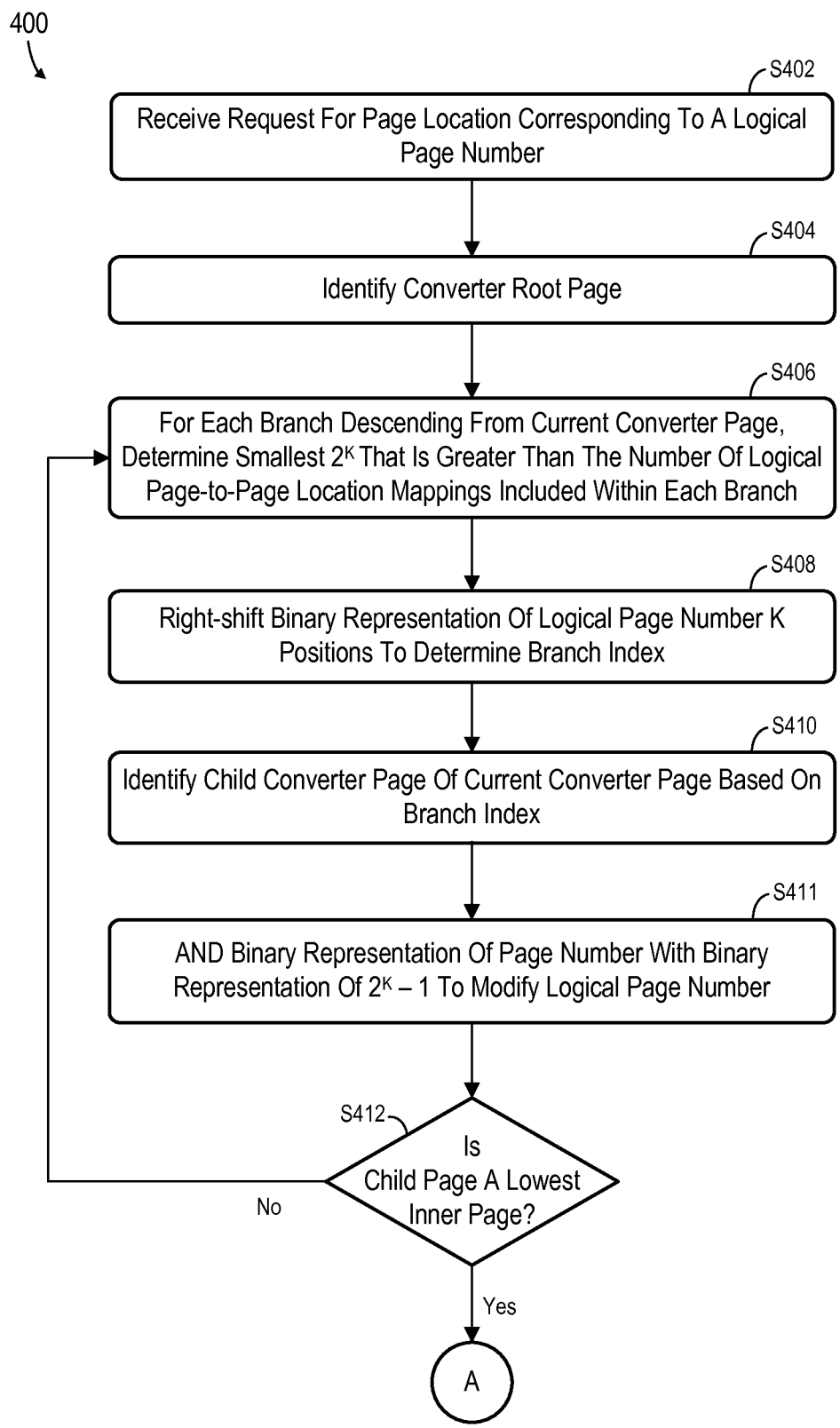
FIGS. 4A and 4B comprise a flow diagram of a process to locate a mapping in a converter leaf page according to some embodiments.
Figure 4B:
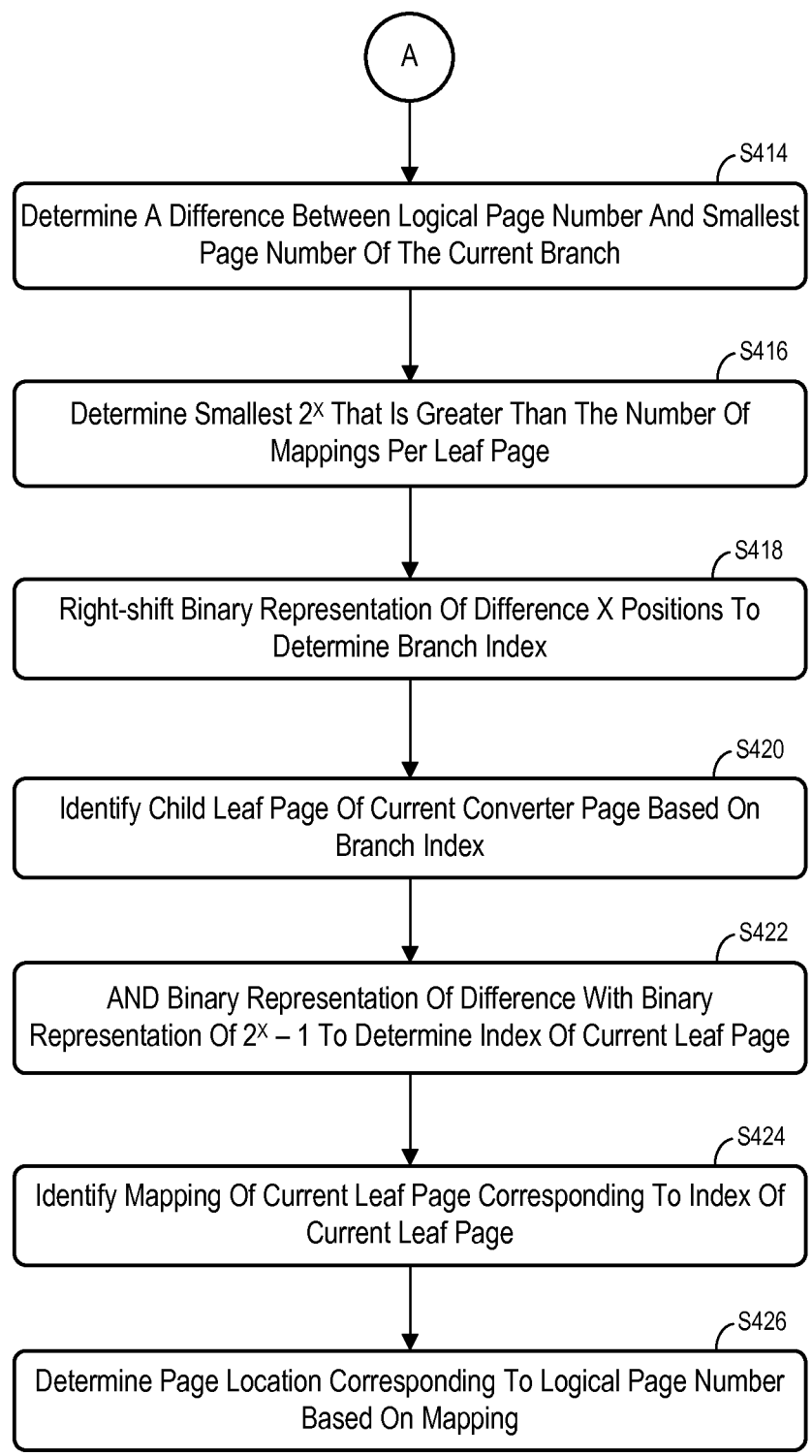

FIGS. 4A and 4B comprise a flow diagram of process 400 to traverse a converter in order to determine a page-number-to-datastore location mapping according to some embodiments. In some embodiments, various hardware elements of a database execute program code to perform process 400. Process 400 may be performed by data access manager 114 of database server process 110 according to some embodiments. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to process 400, converter pages are loaded into a cache. The converter pages may comprise inner pages (including a converter root page) and leaf pages as described above. The loaded converter pages may be copies of converter pages stored within a persistent datastore.

Initially, at S402, a request for a page location corresponding to a logical page number is received. The page location may be a location of a datastore at which a data page associated with the logical page number is stored. In some embodiments, such a request is received after it is determined that the data page is not stored within a database cache. For purposes of example, it will be assumed that request for a page location of logical page number eighteen is received at S402.

A converter root page is identified at S404. The converter root page is assumed to be stored, along with all other pages of a converter, in a cache for fast access as described herein. Each converter page is associated with an identifier, which may be used in conjunction with a hashmap to determine a cache memory address at which the converter page is stored. The database may define an object storing the identifier of the converter root page. This identifier may therefore be used with the hashmap to determine the cache memory address of the converter root page at S404.

Next, at S406, for each branch descending from the current converter page, a power of two (e.g., $2^k$) is determined. This $2^k$ is the smallest $2^k$ that is greater than the number of logical page number-to-page location mappings included within each branch descending from the converter root page.

For example, with reference to converter 30 of FIG. 3, three branches 34-36 descend from root page 33. Each branch 34-36 includes two leaf pages, with each leaf page including seven logical page number-to-page location mappings. Since each branch 34-36 includes fourteen mappings, the number sixteen (i.e., $2^4$) is determined at S406 as the smallest power of two which is greater than the number of mappings per branch (i.e., fourteen).

At S408, a binary representation of the logical page number is right-shifted k positions to determine a branch index. In the present example, k=4 and the logical page number eighteen=$00010010_2$. Therefore, after right-shifting this binary representation four positions, the determined branch index is $00000001_2=1_{10}$.

In the example described in the Background, a branch index was determined by performing a division operation. S408 also implements a division operation to generate a quotient. However, because the divisor (i.e., sixteen) is a power of two, the division operation is easily performed using a bit shift operation. Moreover, the present inventors have discovered a system to utilize the simpler and equivalent bit-shifting operation even in cases where the actual number of mappings per branch is not a power of two. As described above, due to converter page header information, the actual number of mappings per branch is typically not a power of two even though a total converter page size may be a power of two.

A child of the current converter page is identified based on the branch index at S410. Continuing with the present example, and because a branch index of 1 was determined at S408, the page identifier 0FC is determined from the indexed list of identifiers stored in root page 33. The page identifier is used with the aforementioned hashmap to determine a cache memory address of converter page 38 at S410.

At S411, the logical page number is modified for consistency with the page numbers within the current branch of the converter. For example, a binary representation of the logical page number is AND'ed with $2^k-1$, which removes the high bits used to determine the branch and leaves the lower k bits set. This operation (e.g., 18 AND 3) is equivalent to the modulo operation described in Background (e.g., 18 mod 4) because 4 is a power of two. Therefore, the present inventors have discovered a system to utilize the simpler equivalent operation even in cases where the actual number of mappings per branch is not a power of two.

Alternatively, and as also described in the Background, the logical page number can be modified at S411 as the difference between the original logical page number and the smallest page number addressable by the current converter branch. This operation is also equivalent to the aforementioned modulo operation.

At S412, it is determined whether the identified child converter page is a lowest-level inner page of converter 30. In other words, it is determined whether the children of the determined child converter page are leaf pages. If not, flow returns to S406, at which point the determined child converter page is considered the current converter page. Accordingly, cycling through S406, S408, S410 and S411 allows fast traversal through multiple levels of converter inner pages. Although the number of mappings per branch will decrease after each cycle, converter 30 may be constructed such that a different power of two (and value of k) is determined and used in each cycle.

According to the present example, converter inner page 38 is a lowest-level inner page. Flow therefore proceeds from S412 to S414, at which a difference is determined between the logical page number and the smallest logical page number for which a mapping exists in the current branch. The smallest page number referenced in the branch of converter page 38 is page number sixteen, and the difference between this number and the logical page number of interest is two.

Next, a smallest $2^x$ that is greater than the number of logical page number-to-page location mappings included within each leaf page is determined at S416. Each of converter pages 42 and 43 include seven mappings, therefore eight (i.e., $2^3$) is determined at S416 as the smallest power of two which is greater than seven.

A binary representation of the determined difference is right-shifted x positions at S418 to determine a branch index. In the present example, x=3 and the binary representation of the difference (i.e., 2)=$00000010_2$. Therefore, after right-shifting this binary representation three positions, the determined branch index is $00000000_2=0_{10}$. As described above, this branch index is a quotient resulting from dividing the difference by $2^x$.

The branch index is used at S420 to identify a child leaf page from the indexed list stored within converter page 38. Because the index is 0, the determined identifier is 94, which is used in conjunction with the hashmap to locate leaf page 42 within the cache.

Next, at S422, an AND operation is performed on the binary representation of the difference and a binary representation of the value $2^x-1$ to determine an index of the current leaf page. Again, the binary representation of the difference is $00000010_2$, and the binary representation of $2^x-1$ (i.e., 7) is $00000111_2$. Accordingly, the operation at S422 results in a leaf page index of $00000010_2=2_{10}$.

The above Background describes the use of a modulo operation to determine a leaf page index. However, the operation of S422 (e.g., 2 AND 7) is equivalent to a modulo operation (e.g., 2 mod 8) because 8 is a power of two. Again, the present inventors have discovered a system to utilize a less resource-consumptive operation even in cases where the actual number of mappings per leaf page is not a power of two.

Current leaf page 42 includes an indexed list of mappings, therefore the determined leaf page index is used at S424 to identify a corresponding mapping of current leaf page 42. Since the determined leaf page index is 2, and because the mapping indices begin at zero, the third logical page number-to-page location mapping is identified at S424. Next, at S426, the page location of the identified mapping is determined. This page location is a location in the persistent datastore at which a data page associated with the logical page number is stored.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A processor-implemented method for a database system, comprising:
   receiving a request for a page location corresponding to a logical page number;
   determining a difference between the logical page number and a smallest logical page number of each of a plurality of converter leaf pages descending from a parent converter inner page;
   determining a smallest number $2^x$ that is greater than the number of logical page number-to-page location mappings within each one of the plurality of converter leaf pages;
   right-shifting, by x positions, a binary representation of the difference to determine a branch index;
   identifying one of the plurality of converter leaf pages based on the branch index and on an indexed list of converter page identifiers within the parent converter inner page;
   logically ANDing the binary representation of the difference with a binary representation of $2^x-1$ to determine a mapping index of the identified converter leaf page;
   identifying a mapping of the identified converter leaf page based on the mapping index; and
   determining the page location corresponding to the logical page number based on the mapping.

2. The processor-implemented method according to claim 1, wherein each of the plurality of converter pages comprises $2^x-1$ logical page number-to-page location mappings.

3. The processor-implemented method according to claim 1, further comprising:
   prior to determining the difference, determining a smallest number $2^k$ that is greater than the total number of logical page number-to-page location mappings within all of the plurality of converter leaf pages;
   right-shifting a binary representation of the logical page number k positions to determine a second branch index; and
   identifying the parent converter inner page based on the second branch index and on a second indexed list of converter page identifiers within a grandparent converter inner page of the plurality of converter leaf pages.

4. The processor-implemented method according to claim 3, further comprising:
   determining that the parent converter inner page is a lowest-level converter inner page.

5. The processor-implemented method according to claim 1, wherein the plurality of converter pages do not include a mapping which maps logical page number $2^x-1$ to a page location.

6. A non-transitory computer-readable medium storing program code, the program code executable by a computer to cause the computer to:
   receive a request for a page location corresponding to a logical page number;

determine a difference between the logical page number and a smallest logical page number of each of a plurality of converter leaf pages descending from a parent converter inner page;

determine a smallest number $2^x$ that is greater than the number of logical page number-to-page location mappings within each one of the plurality of converter leaf pages;

right-shift, by x positions, a binary representation of the difference to determine a branch index;

identify one of the plurality of converter leaf pages based on the branch index and on an indexed list of converter page identifiers within the parent converter inner page;

logically AND the binary representation of the difference with a binary representation of $2^x-1$ to determine a mapping index of the identified converter leaf page;

identify a mapping of the identified converter leaf page based on the mapping index; and determine the page location corresponding to the logical page number based on the mapping.

7. The non-transitory computer-readable medium according to claim 6, wherein each of the plurality of converter pages comprises $2^x-1$ logical page number-to-page location mappings.

8. The non-transitory computer-readable medium according to claim 6, the program code further executable by the computer to cause the computer to:

determine, prior to determining the difference, a smallest number $2^k$ that is greater than the total number of logical page number-to-page location mappings within all of the plurality of converter leaf pages;

right-shift a binary representation of the logical page number k positions to determine a second branch index; and identify the parent converter inner page based on the second branch index and on a second indexed list of converter page identifiers within a grandparent converter inner page of the plurality of converter leaf pages.

9. The non-transitory computer-readable medium according to claim 8, the program code further executable by the computer to cause the computer to:

determine that the parent converter inner page is a lowest-level converter inner page.

10. The non-transitory computer-readable medium according to claim 6, wherein the plurality of converter pages do not include a mapping which maps logical page number $2^x-1$ to a page location.

11. A system comprising:
a datastore storing a plurality of logical data pages;
a database cache;
a memory storing processor-executable process steps; and
a processor to execute the processor-executable process steps to cause the system to:

receive a request for a page location corresponding to a logical page number;

determine a difference between the logical page number and a smallest logical page number of each of a plurality of converter leaf pages descending from a parent converter inner page;

determine a smallest number $2^x$ that is greater than the number of logical page number-to-page location mappings within each one of the plurality of converter leaf pages;

right-shift, by x positions, a binary representation of the difference to determine a branch index;

identify one of the plurality of converter leaf pages based on the branch index and on an indexed list of converter page identifiers within the parent converter inner page;

logically AND the binary representation of the difference with a binary representation of $2^x-1$ to determine a mapping index of the identified converter leaf page;

identify a mapping of the identified converter leaf page based on the mapping index; and determine the page location corresponding to the logical page number based on the mapping.

12. The system according to claim 11, wherein each of the plurality of converter pages comprises $2^x-1$ logical page number-to-page location mappings.

13. The system according to claim 11, the processor to further execute the processor-executable process steps to cause the system to determine, prior to determining the difference, a smallest number $2^k$ that is greater than the total number of logical page number-to-page location mappings within all of the plurality of converter leaf pages;

right-shift a binary representation of the logical page number k positions to determine a second branch index; and identify the parent converter inner page based on the second branch index and on a second indexed list of converter page identifiers within a grandparent converter inner page of the plurality of converter leaf pages.

14. The system according to claim 13, the processor to further execute the processor-executable process steps to cause the system to determine that the parent converter inner page is a lowest-level converter inner page.

15. The system according to claim 11, wherein the plurality of converter pages do not include a mapping which maps logical page number $2^x-1$ to a page location.

* * * * *